(12) United States Patent
Doumuki

(10) Patent No.: US 8,542,665 B2
(45) Date of Patent: *Sep. 24, 2013

(54) SYSTEM AND METHOD FOR NETWORK SETUP OF WIRELESS DEVICE THROUGH A SINGLE INTERFACE

(75) Inventor: Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/834,128

(22) Filed: Aug. 6, 2007

(65) Prior Publication Data

US 2009/0043998 A1   Feb. 12, 2009

(51) Int. Cl.
*H04W 4/00* (2009.01)
*H04B 7/212* (2006.01)
*H04L 12/28* (2006.01)

(52) U.S. Cl.
USPC ........... 370/348; 370/329; 370/341; 370/389; 370/395.2; 370/395.3; 370/431

(58) Field of Classification Search
None
See application file for complete search history.

(56) References Cited

U.S. PATENT DOCUMENTS

| 6,704,401 | B2 | 3/2004 | Piepho et al. | |
|---|---|---|---|---|
| 2004/0168081 | A1* | 8/2004 | Ladas et al. | 713/201 |
| 2004/0242197 | A1 | 12/2004 | Fontaine | |
| 2004/0249977 | A1* | 12/2004 | Minamisawa | 709/245 |
| 2005/0025103 | A1 | 2/2005 | Ko et al. | |
| 2005/0086328 | A1 | 4/2005 | Landram et al. | |
| 2005/0239445 | A1* | 10/2005 | Karaoguz et al. | 455/414.1 |
| 2005/0266826 | A1* | 12/2005 | Vlad | 455/410 |
| 2005/0277412 | A1 | 12/2005 | Anderson et al. | |
| 2006/0023651 | A1* | 2/2006 | Tsuchiuchi et al. | 370/310 |
| 2006/0184998 | A1 | 8/2006 | Smith et al. | |
| 2006/0251256 | A1* | 11/2006 | Asokan et al. | 380/270 |
| 2006/0271690 | A1 | 11/2006 | Banga et al. | |
| 2007/0157024 | A1* | 7/2007 | Miller | 713/168 |
| 2007/0186105 | A1* | 8/2007 | Bailey et al. | 713/168 |
| 2007/0239821 | A1* | 10/2007 | Huettner | 709/201 |
| 2008/0279161 | A1* | 11/2008 | Stirbu et al. | 370/338 |

FOREIGN PATENT DOCUMENTS

EP   1 487 224 A1   12/2004
JP   2006-042087    2/2006

OTHER PUBLICATIONS

IEEE. "Information technology-... Part 11: Wireless LAN Medium Access Control and Physical Layer specifications" IEEE Std 802.11-1997. Jun. 26, 1997. pages 62-65.*

Denis Chalon, Yves Durand, Bruno Richard: "An Overview of Automatic Network Configuration for IPv4 Appliances" HP Laboratories Gemoble, Sep. 28, 2001, pp. 1-16.

(Continued)

*Primary Examiner* — Faruk Hamza
*Assistant Examiner* — Thinh Tran
(74) *Attorney, Agent, or Firm* — John L. Rogitz; John M. Rogitz

(57) ABSTRACT

A method to add a new wireless device to a home network through one common interface administrator such as a TV hosting an application. A user simply inputs one identification code of the new wireless device to the TV using a remote commander. Since all wireless devices are registered through the same application regardless of their type, the setup experience is consistent to a user who is required to have no special knowledge. Through the process, the administrator TV obtains information of wireless devices sought to be registered in the home network, enabling the administrator TV to capture the network structure or topology, which may be used for further applications, without implementing dedicated protocols such as UPnP to collect the information.

8 Claims, 2 Drawing Sheets

(56) References Cited

OTHER PUBLICATIONS

Günter Obiltschining, "Automatic Configuration and Service Discovery for Network Smart Devices" Electronica Embedded Conference Munich 2006, pp. 1-8.

N. Sriskanthan, D. Tendon, K.K. Lee, "Protocol for Plug and Play in Bluetooth based Home Networks" Consumer Electronics, IEEE Transactions on May 2004, vol. 50, No. 2, pp. 457-.

Doumuki, "System and Method for Network Setup of Wireless Device for Home Network", Office Action dated Jul. 22, 2009 in related U.S. Appl. No. 11/834,158 (1168.259).

Tohru Doumuki, "System and Method for Network Setup of Wireless Device for Home Network", Office Action dated Dec. 14, 2009 in co-pending U.S. Appl. No. 11/834,158, filed Aug. 6, 2007 (1168.259).

\* cited by examiner

SYSTEM AND METHOD FOR NETWORK SETUP OF WIRELESS DEVICE THROUGH A SINGLE INTERFACE

FIELD OF THE INVENTION

The present invention relates generally to systems and methods for the network set-up of wireless devices through a single interface.

BACKGROUND OF THE INVENTION

As network technologies are being adopted in consumer electronics (CE) products such as digital TVs, video recorders, digital still/video cameras, other wireless digital CE devices, etc. to enable these devices to communicate with other like devices in a home network, the network setup process becomes an obstacle for ease of use in these products. This is essentially because network setup is a computer-oriented procedure, which is cumbersome and unfamiliar to most non-technical users.

For example, even when a home has wireless network installed, each time a user adds a new wireless device, the user must undertake the cumbersome setup process to input network configuration. This typically includes typing in network ID and password, sometimes referred to as a service set identifier (SSID) and wired equivalent piracy (WEP) keys, respectively. Although this may be a common process for a PC-based network, as understood herein the following issues arise when the same process is applied to CE products.

A user must have knowledge about the nature and location of network configuration information (e.g., SSID and WEP keys) that is required, as well as knowing when and how to input the information. Also, each network product must have an input/output device such as a keypad to type in the necessary information and to display confirmation. Providing such I/O devices, however, is not practical for many CE products. Moreover, because the user interface or setup menu typically varies from product to product, a non-technical user can become further confused.

Accordingly, with the above in mind users frequently encounter difficulty in connecting new devices to their home networks. As recognized herein, when a user has difficulty completing the setup process, the user typically calls customer support of the manufacturer for assistance. This, however, does not guarantee ease in identifying the cause of the difficulty so that a solution can be quickly provided over the phone, and moreover customer support is costly.

SUMMARY OF THE INVENTION

A method is disclosed for configuring a network device for a network. Using a remote commander, a device identification (ID) that is unique to the device is input to an administrator such as a TV. The method includes sending the device ID from the administrator to a network component such as a wireless access point in the network, and using the device ID as a temporary network ID to establish communication between the component and the device. A main network ID is sent from the component to the device and subsequently used in communication between the device and the network.

In some embodiments the main network ID is for a main channel and initially is sent to the device on a subchannel using the temporary network ID. The subchannel may be deactivated after communication is established with the device over the main channel. The device can be a wireless device, in which case the temporary network ID may be a service set identifier (SSID), and the main network ID may be a SSID. A password can be derived as a function of the device ID, and the password can be a wired equivalent piracy (WEP) key.

In another aspect, a method for configuring a network device for a network includes using a remote commander to input a device identification (ID) $N_b$ unique to the device to a TV that hosts a setup GUI. The remote commander is also used to input to the TV an access point identification (ID) $N_a$ which is unique to an access point, and this can be done by means of the setup GUI. The method further includes sending the device ID $N_b$ from the TV to the access point, using the device ID $N_b$ as a temporary network ID to establish communication between the access point and the device, and sending the access point ID $N_a$ form the access point to the device. Subsequently, the access point ID $N_a$ is used in communication between the device and the network.

In still another aspect, a system includes means for providing a device ID unique to a network device to a home network administrator. The system also includes means for communicating a main network ID associated with an access point to the device over the home network using the device ID as a temporary network ID. Means are provided for subsequently using the main network ID to establish communication between the device and at least one component on the network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
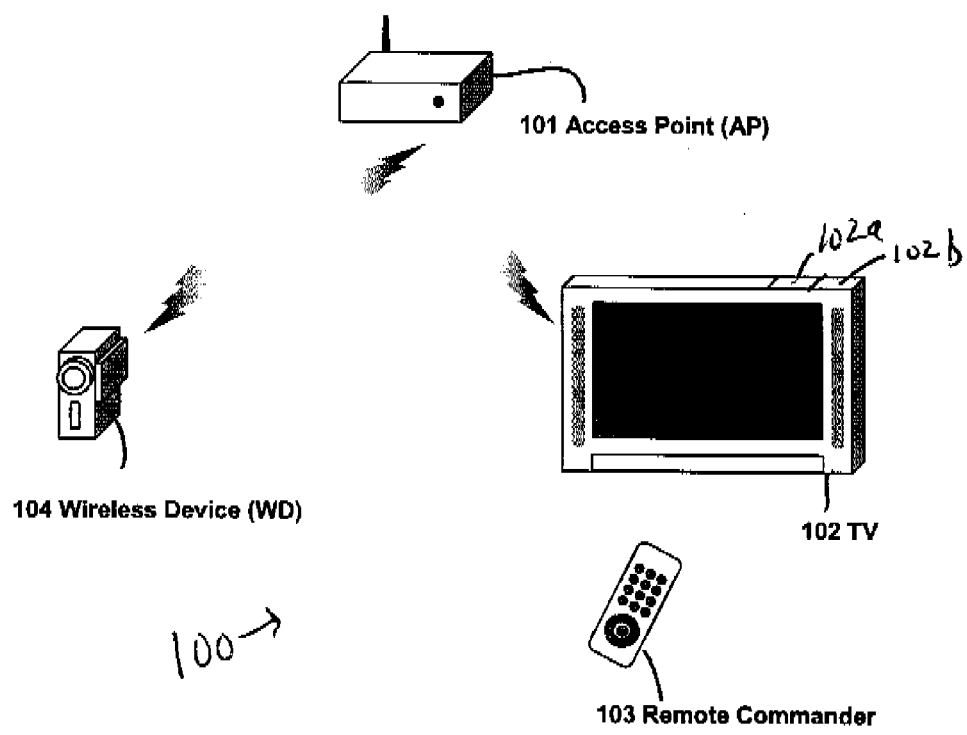
FIG. 1 is a block diagram of a non-limiting system in accordance with present principles.

Referring initially to FIG. 1, a system is shown, generally designated 100, which in one embodiment is a wireless borne network in a dwelling. The system 100 includes one or more access points (AP) 101, typically wireless access points, and a single interface administrator 102 having a digital processor 102*a* and a tangible computer storage medium 102*b* such as disk or solid state storage. The administrator 102 maybe a TV that can respond to wireless commands and other wireless inputs from a remote commander 103 as shown. The system 100 also includes one or more wireless devices (WD) 104 that may be added to the system 100 in accordance with logic below. Without limitation the WD 104 may be a digital still or video camera, digital music player, wireless digital TV, etc. The WD 104, AP 101, and administrator 102 may all communicate wirelessly with each other. Like the administrator 102, the WD 104 and AP 101 contain respective digital processors and tangible storage media.

In non-limiting embodiments the AP 101 has a capability to accommodate two wireless channels (main and subchannel), each of which is specified by SSID and WEP key. In one implementation the SSID of the main channel may be designated "$N_a$", and the WEP key can be calculated by a specific function F(x), which is commonly implemented in the WD 104 as well. The user may be informed of these numbers via printing the numbers on a product information sheet that is vended with the AP 101, it being understood that the SSID typically is set to the main channel number $N_a$ during manufacture.

Figure 2:
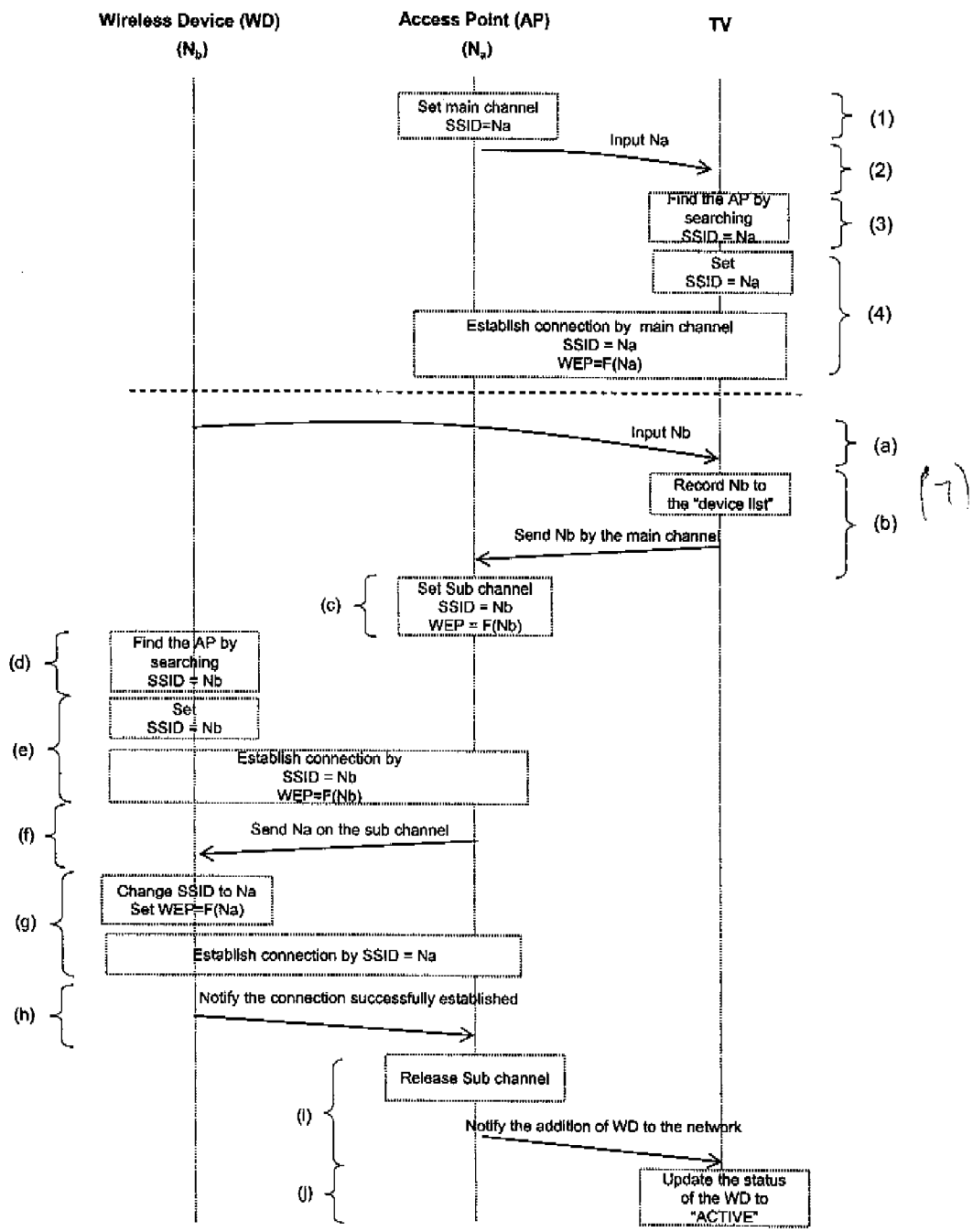
FIG. 2 is a logic chart illustrating non-limiting steps in accordance with present principles.

With the above in mind, reference is now made to FIG. 2, which shows a sequence of logic in accordance with present principles. It is to be understood that the logic may be embodied in the above-disclosed tangible media for execution by one or more the above-described processors.

The WD 104 is vended with an initial temporary device identification designated herein $N_b$, which is unique to each product and which may be in the form of an SSID in, e.g., non-limiting wireless applications.

At state (1), as discussed above the main channel SSID $N_a$ of the AP 101 is set in the AP and then input at state (2) to the administrator TV 102. This may done by a user manipulating the remote commander 103 as appropriate to navigate the TV's network setup menu GUI.

At state (3), the administrator TV 102 scans for wireless access points with SSID=Na and discovers the AP 101. For security reasons, the AP 101 may only reply to the scan which seeks SSID=Na and may not respond to any other scan or search inquiry.

Once the AP 101 is discovered by the administrator TV 102, at state (4) the administrator TV 102 and AP 101 implement a common secret function F(x), by which a WEP key ($K_a$) corresponding to the SSID=$N_a$ is calculated as $K_a$=F($N_a$). By setting the same SSID and WEP key, i.e. $N_a$ and $K_a$, respectively, the administrator TV 102 and AP 101 wirelessly communicate with each other through the main channel.

Next, the procedure to add a new wireless device (WD) 104 to the system 100 is explained. It is to be understood that the WD 104 is provided with its own identification code $N_b$ at step (a) which can be input by the user using the remote commander 103 and the same UI application screen that was used to input the code of the AP 101.

At state (b) the administrator TV 102 receives the device ID $N_b$ from the remote commander 103 and records it to a registered device list, categorizing it as, e.g., "suspended". The administrator TV 102 also sends the device ID $N_b$ to the AP 101 preferably using the main channel already established with an SSID=$N_a$.

At state (c), upon receiving the device ID $N_b$, the AP 101 sets the SSID of the subchannel mentioned above to be equal to the device ID $N_b$, also calculating the subchannel WEP key to be a function of N. The function used to calculate the WEP key may be a secret function commonly implemented for or by the AP 101 and WD 104.

Proceeding to step (d), the WD 104 searches for the AP 101 by scanning for access points in accordance with WAP scanning principles known in the art. This may be invoked by the user from a setup menu, or alternatively it may be started automatically when the power is turned on first time by the user. By scanning, the WD 104 discovers the subchannel with an SSID=$N_b$.

Additionally, at step (e) the WD 104 also sets its SSID to be the device ID $N_b$ and its WEP key to be the above-discussed function of the device ID $N_b$. As a consequence, the WD 104 can establish a wireless communication connection with the AP 101 over the subchannel.

With the subchannel communication established, at step (f) the AP 101 sends the SSID $N_a$ of the main channel to the WD 104 via the subchannel. Now having the main channel SSID, at step (g) the WD 104 changes its SSID to be the main channel SSID $N_a$ and also sets its WEP key to be a function of the main channel SSID $N_a$, establishing communication with the AP 101 through the main channel. In this way, security of the main channel SSID and WEP keys of the home network is preserved.

Completing the logic, at step (h) the WD 104 sends a message to the AP 101 to notify the AP 101 that communication with the WD 104 is now over the main channel with SSID=$N_a$. Upon receiving the message, at step (i) the AP 101 deactivates the subchannel and preferably erases the SSID of the subchannel. The AP 101 then notifies the administrator TV 102 that the W1104 is now added to the network and available for communication. If desired, at step (j) the administrator TV 102 can change the status of the WD 104 in the registered device list from "suspended" to "active".

It may now be appreciated that using the logic of FIG. 2, advantageously the user is requested to do nothing beyond inputting one and only one ID code for each device, and not input any other information for a device. The interface to input those IDs is commonly hosted by the same device, which is the administrator TV 102 in the above example, so that the user's experience is simple and consistent.

Alternative methods may be used to input the WD device ID $N_b$ to the administrator TV 102 beside the example described above. For example, each wireless device may come with an ID card that stores the ID code, and the administrator TV 102 may have a card reader. A user can simply slide, insert, or touch the card to the card reader of the administrator TV 102, depending on the type of the card and its memory technology. Any type of memory technologies, including optical, magnetic, or electrical memory, can be applied to the ID card and reader.

The ID codes ($N_a$, $N_b$) may be configured in a way that other devices can recognize the attributes of the device. For example, the ID may have eight digits code composed by numbers and alphabets, and the first three digits can represent the device attribute with the rest of the code indicating a device-unique ID. The administrator TV 102 may implement look-up tables so that it recognizes the device type and manufacturer from the ID code. This enables the administrator TV 102 to determine a network structure or topology map, which is convenient for a user to use to confirm network structure and provide further ease of use in network applications. For example, the administrator TV 102 can work as a central control point of those devices and content those devices have. Conventionally, a network terminal needs to implement further protocols such as UPnP on IP in order to capture the network structure, but these protocols are not required in the present method. To keep the structure updated, the AP 101 may inform the administrator TV 102 when the status of one of the devices is changed.

In the above example, the wireless network is assumed to operate in the infrastructure mode where the access point hosts network access. It is to be understood, however, that other types of network modes or schemes may be used. For example, ad-hoc mode, or so-called mesh networks can also adopt the present method and system. Additionally, the administrator is not necessarily implemented as a TV. Other suitable devices including PCs may implement the functionality of administrator.

Further, while in the above example the administrator TV 102 and the access point 101 are the separate entities, they may be implemented in a single device, i.e., the functionality in the access point may be implemented as a part of the device where administrator is implemented.

It may now be appreciated that the present invention provides a system and method to add a device to a home network through one common interface on one of the devices (host device) in the network. The host device, such as the above-described TV, can host a setup application, on which a user can simply input one identification code of the new device. Consequently, input and display devices are only required of the host device. Since all devices are set up through the same application on the same host device regardless of their type, the procedure is consistent to the user who is required to have no special knowledge, hence it provides case-of-use to home networking.

While the particular SYSTEM AND METHOD FOR NETWORK SETUP OF WIRELESS DEVICE THROUGH A SINGLE INTERFACE is herein shown and described in detail, it is to be understood that the subject matter which is encompassed by the present invention is limited only by the claims.

What is claimed is:

1. A method for configuring a network device for a network, comprising:
   receiving at an administrator TV from a remote commander (RC) a device identification (ID) unique to the network device;
   sending the device ID from the administrator TV to an access point in the network on a main channel having a main service set identifier (SSID);
   wherein responsive to receiving the device ID on the main channel, the access point establishes a temporary SSID of a subchannel to be equal to the device ID;
   making the temporary SSID available to scans of the subchannel by the network device;
   establishing a communication between the access point and the network device using the temporary SSID;
   sending, by the access point, the main SSID to the network device over the subchannel; and
   subsequently using the main SSID to communicate with the network device over the main channel in lieu of the temporary SSID.

2. The method of claim 1, comprising, responsive to commencement of communication with the network device over the main channel, deactivating the subchannel.

3. The method of claim 1, further comprising deriving at least one password as a function of the device ID.

4. The method of claim 3, wherein the password is a wired equivalent piracy (WEP) key.

5. A system, comprising:
   a network device;
   an access point; and
   an administrator audio video display device (AVDD), the AVDD being programmed with logic to receive from a remote commander (RC) a device identification (ID) unique to the network device;
   the AVDD being programmed with logic to send the device ID to the access point on the main channel having a main service set identifier (SSID);
   wherein the access point, responsive to receiving the device ID on the main channel, is programmed to establish a temporary SSID of a subchannel to be equal to the device ID;
   the access point being programmed to make the temporary SSID available to scans of the subchannel by the network device;
   the access point and the network device being programmed to establish communication between each other using the temporary SSID;
   the access point being programmed to send the main SSID to the network device over the subchannel; and
   the access point being programmed to subsequently use the main SSID to communicate with the network device over the main channel in lieu of the temporary SSID.

6. The system of claim 5, wherein at least one of the AVDD, network device, access point is programmed to derive at least one password as a function of the device ID.

7. The system of claim 6, wherein the password is a wired equivalent piracy (WEP) key.

8. The system of claim 5, wherein the access point is programmed, responsive to commencement of communication with the network device over the main channel, to deactivate the subchannel.

* * * * *